United States Patent
Aoki

(10) Patent No.: US 9,132,738 B2
(45) Date of Patent: Sep. 15, 2015

(54) ELECTRIC VEHICLE

(71) Applicant: Takanori Aoki, Nissin (JP)

(72) Inventor: Takanori Aoki, Nissin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 55 days.

(21) Appl. No.: 13/778,818

(22) Filed: Feb. 27, 2013

(65) Prior Publication Data

US 2013/0231811 A1   Sep. 5, 2013

(30) Foreign Application Priority Data

Mar. 1, 2012   (JP) .................................. 2012-045392

(51) Int. Cl.
  *B60L 11/18*  (2006.01)
  *B60L 1/00*   (2006.01)
  *B60L 11/12*  (2006.01)

(52) U.S. Cl.
  CPC ............... *B60L 11/18* (2013.01); *B60L 1/006* (2013.01); *B60L 11/12* (2013.01); *B60L 11/1842* (2013.01); *B60L 11/1861* (2013.01); *B60L 11/1881* (2013.01); *B60L 2240/545* (2013.01); *Y02E 60/721* (2013.01); *Y02T 10/7005* (2013.01); *Y02T 10/705* (2013.01); *Y02T 10/7044* (2013.01); *Y02T 10/7077* (2013.01); *Y02T 90/121* (2013.01); *Y02T 90/128* (2013.01); *Y02T 90/14* (2013.01); *Y02T 90/163* (2013.01); *Y02T 90/34* (2013.01); *Y04S 10/126* (2013.01)

(58) Field of Classification Search
  USPC ............... 701/22; 180/65.265, 65.275, 65.28, 180/65.285, 65.29, 65.31; 903/904; 307/10.1, 9.1

See application file for complete search history.

(56) References Cited

U.S. PATENT DOCUMENTS

| | | | | |
|---|---|---|---|---|
| 4,507,720 | A  * | 3/1985  | Colbrese | 363/13 |
| 6,724,100 | B1 * | 4/2004  | Gabriel  | 307/9.1 |
| 2004/0027093 | A1 | 2/2004 | Tashiro et al. | |
| 2010/0133900 | A1 * | 6/2010 | King | 307/9.1 |
| 2010/0318250 | A1 | 12/2010 | Mitsutani | |
| 2011/0291475 | A1 * | 12/2011 | Schaffnit | 307/10.1 |

FOREIGN PATENT DOCUMENTS

| | | | | |
|---|---|---|---|---|
| CN | 1870382 | A | 11/2006 | |
| CN | 101202368 | A | 6/2008 | |
| CN | 102267396 | A | 12/2011 | |
| EP | 1738947 | A2 | 1/2007 | |
| JP | 2000 303874 | * | 10/2000 | ............ F02D 29/06 |
| JP | 2004-357459 | A | 12/2004 | |
| JP | 2007 008349 | * | 1/2007 | ............ B60W 10/30 |
| JP | 20078349 | A | 1/2007 | |
| JP | 2008-162543 | A | 7/2008 | |

(Continued)

*Primary Examiner* — Mary Cheung
*Assistant Examiner* — Brian P Sweeney
(74) *Attorney, Agent, or Firm* — Sughrue Mion, PLLC

(57) ABSTRACT

An electric vehicle includes: a vehicle-mounted electric power storage device; an electric power generation mechanism that is configured to generate charging electric power for charging the electric power storage device; an electric power supply device that is configured to supply electric power to external equipment that is not a component of the electric vehicle, by using output electric power from the electric power storage device; and a controller that is configured to control electric power to be supplied by the electric power supply device, according to information indicative of an upper limit of the electric power for charging the electric power storage device.

9 Claims, 8 Drawing Sheets

(56) References Cited

FOREIGN PATENT DOCUMENTS

| JP | 2008 247252 A | * 10/2008 | B60K 6/445 |
| JP | 200971902 A | 4/2009 | |
| JP | 2010-187466 A | 8/2010 | |
| JP | 2011-093491 A | 5/2011 | |
| JP | 201197666 A | 5/2011 | |

* cited by examiner

ELECTRIC VEHICLE

INCORPORATION BY REFERENCE

The disclosure of Japanese Patent Application No. 2012-045392 filed on Mar. 1, 2012 including the specification, drawings and abstract is incorporated herein by reference in its entirety.

BACKGROUND OF THE INVENTION

1. Field of the Invention

The invention relates to an electric vehicle, and more specifically to an electric vehicle having a configuration capable of supplying electric power to external equipment that is not a component of the electric vehicle, by using electric power of a vehicle-mounted electric power storage device.

2. Description of Related Art

In an electric vehicle such as an electric car, a hybrid car, or a fuel cell car configured to be capable of generating a vehicle driving force using a motor, an electric power storage device that stores electric power for driving the motor is mounted.

With regard to a hybrid car as one aspect of the electric vehicle in which an engine and a motor are mounted, Japanese Patent Application Publication No. 2008-162543 (JP-2008-162543 A) describes a hybrid car capable of supplying stored electric power of an electric power storage device to the outside of the vehicle. In addition, Japanese Patent Application Publication No. 2011-93491 (JP-2011-93491 A) describes a hybrid car capable of supplying electric power to external equipment from a battery by connecting the external equipment to a receptacle connected to the battery.

In the hybrid car described in JP-2011-93491 A, in a case where the state of charge (SOC) of the battery is lowered when electric power is supplied to the external equipment from the vehicle-mounted battery, an engine is started in order to charge the battery. At this point, by displaying an arrow indicative of the flow of the electric power between the battery and the receptacle, the start of the engine that a driver does not expect is prevented.

Japanese Patent Application Publication No. 2010-187466 (JP-2010-187466 A) describes a configuration of a vehicular battery charger capable of exchanging electric power between electric cars only by connecting a cable to the electric cars. In addition, Japanese Patent Application Publication No. 2004-357459 (JP-2004-357459 A) describes that, in order to prevent overcharging or overdischarging of the battery in the hybrid car, the allowable range of a motor output is set based on an input/output electric power restriction of the battery according to the state of the battery.

As described in JP-2011-93491 A, even while the electric power is supplied to the external equipment that is not the component of the vehicle, a low state of charge of the battery triggers the start of execution of control, in which electric power for charging the electric power storage device (the battery) is generated by other power sources represented by the engine.

As a result, in a case where the SOC is not properly managed when the electric power is supplied to the external equipment, a state where the SOC is low continues and there is a fear that forced charging of the electric power storage device involving engine operation is frequently executed. When the number of times of the engine operation is increased, it is feared that fuel efficiency deteriorates.

SUMMARY OF THE INVENTION

The invention provides an electric vehicle capable of properly controlling, when electric power is supplied to electric equipment that is not a component of the electric vehicle, by using electric power of a vehicle-mounted electric power storage device, the electric power supply such that a low state of charge (SOC) of the electric power storage device does not continue for a long period of time.

An electric vehicle according to an aspect of the invention includes: a vehicle-mounted electric power storage device; an electric power generation mechanism that is configured to generate electric power for charging the electric power storage device; an electric power supply device that is configured to supply electric power to external equipment that is not a component of the electric vehicle, by using output electric power from the electric power storage device; and a controller that is configured to control electric power to be supplied by the electric power supply device, according to an upper limit of the electric power for charging the electric power storage device.

According to the invention, there is provided an electric vehicle capable of properly controlling the electric power supply such that the low SOC state of the electric power storage device does not continue for a long time period when the electric power is supplied to the electric equipment that is not the component of the vehicle, by using the electric power of the vehicle-mounted electric power storage device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
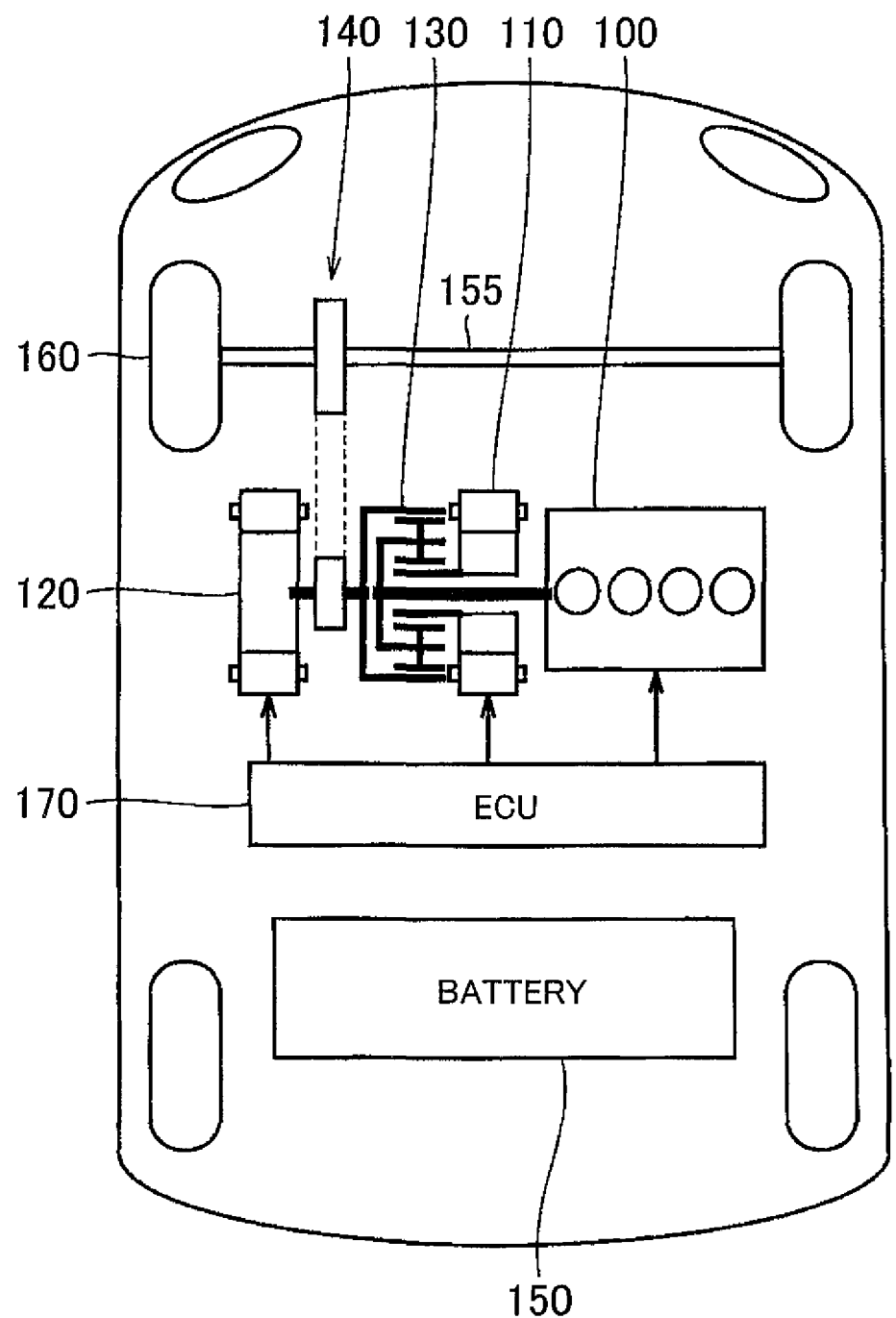
FIG. 1 is a schematic configuration diagram of a hybrid car shown as a representative example of an electric vehicle according to an embodiment of the invention.

A detailed description will be given hereinbelow of an embodiment of the invention with reference to the drawings. Note that, in the following, the same or equivalent portions are designated by the same reference numerals and the description thereof will not be repeated in principle.

First Embodiment

FIG. 1 is a schematic configuration diagram of a hybrid car shown as a representative example of an electric vehicle according to an embodiment of the invention.

Referring to FIG. 1, the hybrid car includes an engine 100, a first motor generator (MG) 110, a second MG 120, a power distributing mechanism 130, a reduction gear 140, and a battery 150 shown as a representative example of an "electric power storage device". The hybrid car is driven with a driving force from at least one of the engine 100 and the second MG 120.

Output shafts of the engine 100, the first MG 110, and the second MG 120 are connected to each other via the power distributing mechanism 130. Power generated by the engine 100 is divided into two paths by the power distributing mechanism 130. One of the paths is a path that drives front wheels 160 via the reduction gear 140 and a drive shaft 155. The other one is a path that drives the first MG 110 to generate electric power.

The first MG 110 is typically a three-phase alternating current dynamo-electric machine. The first MG 110 generates electric power with the power of the engine 100 divided by the power distributing mechanism 130. The electric power generated by the first MG 110 is used according to the running state of the vehicle and an SOC of the battery 150. For example, during normal running, the electric power generated by the first MG 110 is used as electric power for driving the second MG 120.

On the other hand, when the SOC of the battery 150 is lower than a predetermined value, the electric power generated by the first MG 110 is converted from alternating current (AC) to direct current (DC) by an inverter described later. Thereafter, the voltage thereof is adjusted by a converter described later and the electric power is stored in the battery 150. Thus, in the hybrid car shown in FIG. 1, the engine 100 and the first MG 110 constitute an "electric power generation mechanism" for generating electric power for charging the battery 150.

When the first MG 110 operates as a generator, the first MG 110 generates negative torque. The negative torque mentioned herein is torque that becomes a load of the engine 100. When the first MG 110 receives electric power supply to operate as a motor, the first MG 110 generates positive torque. The positive torque mentioned herein is torque that does not become the load of the engine 100, i.e., torque that assists rotation of the engine 100. Note that the same applies to the second MG 120.

The second MG 120 is typically the three-phase AC dynamo-electric machine. The second MG 120 is driven with at least one of electric power stored in the battery 150 and electric power generated by the first MG 110.

The driving force of the second MG 120 is transmitted to the front wheels 160 via the reduction gear 140 and the drive shaft 155. With this, the second MG 120 assists the engine 100, and the vehicle is driven with the driving force from the second MG 120. Note that rear wheels may also be driven instead of or in addition to the front wheels 160.

During regenerative braking of the hybrid car, the second MG 120 is driven by the front wheels 160 via the reduction gear 140 and the drive shaft 155, and the second MG 120 operates as a generator. With this, the second MG 120 operates as a regenerative brake that converts braking energy to electric power. The electric power generated by the second MG 120 is stored in the battery 150.

The battery 150 is charged with regenerated electric power by the regenerative brake, and can also be charged by the "electric power generation mechanism" constituted by the engine 100 and the first MG 110. That is, by starting the engine 100, even during stop of the vehicle, the battery 150 can be actively charged by the electric power generation mechanism.

The power distributing mechanism 130 includes a planetary gear including a sun gear, a pinion gear, a carrier, and a ring gear. The pinion gear is engaged with the sun gear and the ring gear. The carrier supports the pinion gear such that the pinion gear can rotate. The sun gear is coupled to a rotating shaft of the first MG 110. The carrier is coupled to a crankshaft of the engine 100. The ring gear is coupled to a rotating shaft of the second MG 120 and the reduction gear 140.

Figure 2:
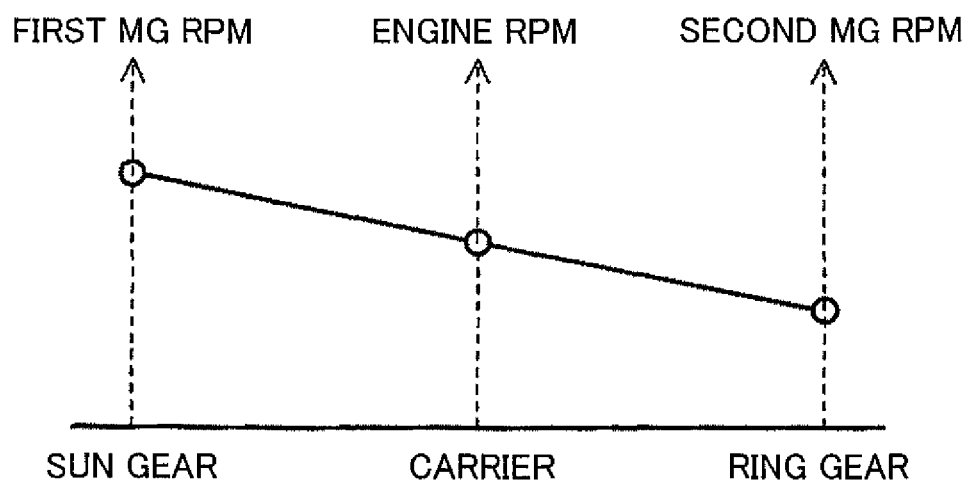
FIG. 2 is an alignment chart during running of the hybrid car shown in FIG. 1.

The engine 100, the first MG 110, and the second MG 120 are coupled to each other via the power distributing mechanism 130 including the planetary gear, so that, as shown in FIG. 2, revolutions per minute (RPMs) of the engine 100, the first MG 110, and the second MG 120 have a relationship in which the RPMs thereof are joined by a straight line in an alignment chart. Thus, an output shaft of the second MG 120 is mechanically coupled to the drive shaft 155 of the front wheels 160 so that a rotational force can be mutually transmitted between the output shaft thereof and the drive shaft 155 thereof.

Referring back to FIG. 1, the battery 150 is an assembled battery obtained by connecting, in series, a plurality of battery modules, in each of which a plurality of secondary battery cells are integrated. The voltage of the battery 150 is, e.g., about 200 V. Note that it is also possible to constitute the "electric power storage device" of electric power storage elements other than the batteries (a capacitor or the like).

The engine 100, the first MG 110, and the second MG 120 are controlled by an electronic control unit (ECU) 170. Note that the ECU 170 is drawn as one block that includes a plurality of ECUs that are typically disposed separately according to their control functions. A controller of the invention is not limited to a single device such as one ECU, and may have a configuration in which a plurality of control portions (the ECUs in the embodiment) are provided and the individual functions of the controller of the invention are implemented by the different control portions.

Figure 3:
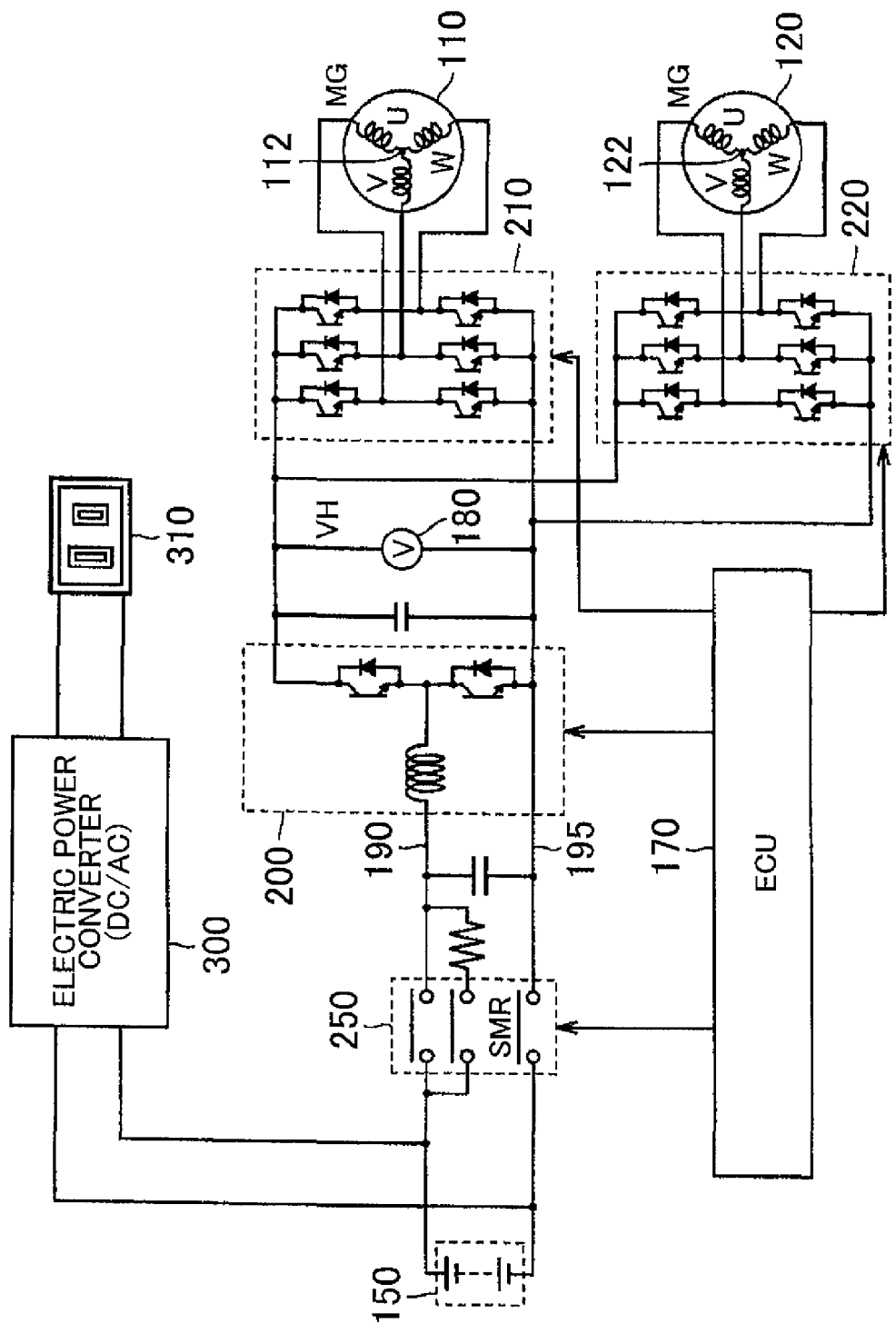
FIG. 3 is a schematic diagram for explaining an example of a configuration of an electric system of the hybrid car shown in FIG. 1.

Next, by using FIG. 3, a description will be given of an example of the configuration of an electric system of the hybrid car. Referring to FIG. 3, the hybrid car is provided with a converter 200, a first inverter 210, a second inverter 220, and a system main relay (SMR) 250.

The converter 200 includes a reactor, two power semiconductor switching elements that are connected in series (hereinafter also referred to simply as switching elements), and an anti-parallel diodes provided for each of the switching elements. As the power semiconductor switching element, an insulated gate bipolar transistor (IGBT), a power metal oxide semiconductor (MOS) transistor, and a power bipolar transistor can be used as appropriate. One end of the reactor is connected to a positive electrode side of the battery 150, while the other end thereof is connected to a connection point at which the two switching elements are connected.

On/Off of each switching element is controlled by the ECU 170 so that a DC voltage VH linked to the first inverter 210 and the second inverter 220 matches a target voltage. That is, the converter 200 is capable of converting the voltage bidirectionally between the DC voltage VH and the output voltage of the battery 150. The DC voltage VH is detected by a voltage sensor 180. Although not shown, the detection result of the voltage sensor 180 is transmitted to the ECU 170.

When electric power discharged from the battery 150 is supplied to the first MG 110 or the second MG 120, the battery voltage is stepped up by the converter 200 and the DC voltage VH is obtained. Conversely, when the battery 150 is charged with electric power generated by the first MG 110 or the second MG 120, the DC voltage VH is stepped down by the converter 200.

The first inverter 210 is a common three-phase inverter, and includes a U-phase arm, a V-phase arm, and a W-phase arm that are connected in parallel. Each of the U-phase arm, the V-phase arm, and the W-phase arm has two switching elements that are connected in series (upper arm element and lower arm element). An anti-parallel diode is connected to each switching element.

The first MG 110 has a U-phase coil, a V-phase coil, and a W-phase coil as stator coils that are star-connected. One ends of the phase coils are connected to each other at a neutral point 112. The other ends of the phase coils are connected to the connection points between the switching elements of the respective phase arms of the first inverter 210.

The first inverter 210 controls the current or the voltage of each phase coil of the first MG 110 so that the first MG 110 operates according to an operation command value (typically a torque command value) set for generating an output (a vehicle drive torque, a power generation torque, or the like) required for running of the vehicle during running of the vehicle. The first inverter 210 is capable of executing bidirectional electric power conversion including an electric power conversion operation in which DC electric power supplied from the battery 150 is converted to AC electric power and the AC electric power is supplied to the first MG 110, and an electric power conversion operation in which the AC electric power generated by the first MG 110 is converted to the DC electric power.

As in the case of the first inverter 210, the second inverter 220 is also a common three-phase inverter. As in the case of the first MG 110, the second MG 120 also has the U-phase coil, the V-phase coil, and the W-phase coil as stator coils that are star-connected. One ends of the phase coils are connected to each other at a neutral point 122. The other ends of the phase coils are connected to the connection points between the switching elements of the respective phase arms of the second converter 220.

The second inverter 220 controls the current or the voltage of each phase coil of the second MG 120 so that the second MG 120 operates according to the operation command value (typically the torque command value) set for generating the output (the vehicle drive torque, a regenerative braking torque, or the like) required for running of the vehicle during running of the vehicle. The second inverter 220 is also capable of executing bidirectional electric power conversion including an electric power conversion operation in which the DC electric power supplied from the battery 150 is converted to the AC electric power and the AC electric power is supplied to the second MG 120 and an electric power conversion operation in which the AC electric power generated by the second MG 120 is converted to the DC electric power.

The SMR 250 is connected to electric power lines 190 and 195. The SMR 250 is a relay that switches between a state where the battery 150 is connected to the electric system and a state where the battery 150 is disconnected from the electric system. When the SMR 250 is opened, the battery 150 is disconnected from the electric system. On the other hand, when the SMR 250 is closed, the battery 150 is connected to the electric system. The state of the SMR 250 is controlled by the ECU 170.

For example, the SMR 250 is closed in response to an operation for turning on a power-on switch (not shown) that requests system activation of the hybrid car, while the SMR 250 is opened in response to an operation for turning off the power-on switch.

In addition, the hybrid car includes: an electric power converter 300 for converting the output electric power from the battery 150 to electric power to be supplied to external equipment that is not the component of the vehicle; and a receptacle 310 for outputting the electric power to be supplied from the electric power converter 300 to the external equipment. The electric power to be supplied that is outputted from the receptacle 310 is typically AC electric power equivalent to electric power supplied from a commercial power supply.

The receptacle 310 is provided in a vehicle cabin. When a switch (not shown) provided in the receptacle 310 is turned on, an "electric power supply mode" in which the electric power to be supplied can be outputted from the receptacle 310 by using the output electric power of the battery 150 is applied. In general, during running and stop of the hybrid car, it is possible to select the mode of the electric power supply from the receptacle 310.

In the electric power supply mode, when the plug (not shown) of electric equipment as the external equipment is connected to the receptacle 310, the electric equipment can operate with electric power from the receptacle 310. That is, irrespective of the running or stop of the hybrid car, by turning on the switch, it becomes possible to take electric power from the battery 150 through the receptacle 310.

There are cases where the SOC of the battery 150 is lowered by the consumption of the electric power by the electric equipment connected to the receptacle 310. In these cases, in order to secure the SOC of the battery 150, the battery 150 is forcibly charged by the electric power generation mechanism including the engine 100 even during stop of the vehicle.

Figure 4:
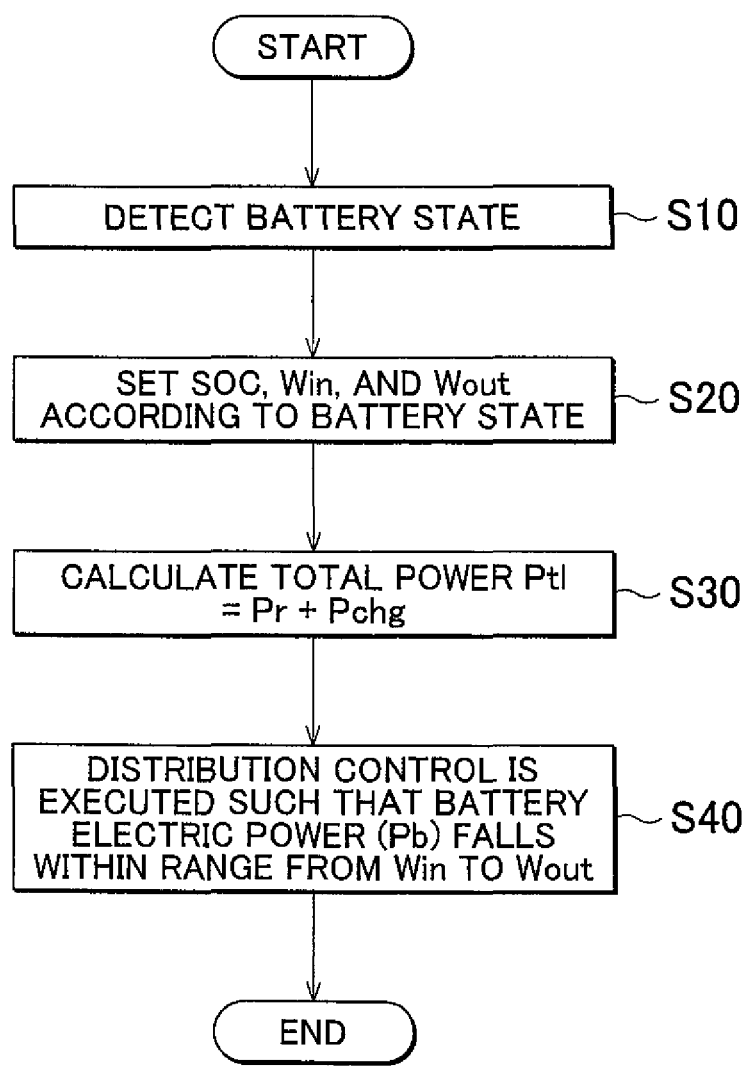
FIG. 4 is a flowchart for explaining a power distribution control that takes account of a battery charge/discharge control in the hybrid car shown in FIG. 1.

FIG. 4 is a flowchart for explaining a power distribution control that takes account of a charge/discharge control of the battery 150 in the hybrid car shown in FIG. 1. The flowchart shown in FIG. 4 is executed in a predetermined cycle by the ECU 170 during stop of the vehicle and running of the vehicle.

Referring to FIG. 4, the ECU 170 detects the state of the battery 150 in Step S10. For example, in Step S10, at least one of the temperature, the voltage, and the current of the battery 150 is detected based on the output of a sensor (not shown).

In Step S20, the ECU 170 sets the SOC, an input electric power upper limit value Win, and an output electric power upper limit value Wout of the battery 150 based on the battery state detected in Step S10. It is assumed that input/output electric power Pb of the battery 150 (hereinafter referred to as battery electric power Pb) satisfies Pb<0 during charging and satisfies Pb>0 during discharging. Accordingly, Win is set to satisfy Win≤0, and is set to satisfy Win=0 when charging is prohibited. Similarly, Wout is set to satisfy Wout≥0, and is set to satisfy Wout=0 when discharging is prohibited.

Consequently, it is to be understood that |Win| means the maximum electric power, at which charging can be performed. Accordingly, in the following, |Win| is also referred to as a charging electric power upper limit value. The charging electric power upper limit value |Win| is shown as a representative example of information indicative of the upper limit of the electric power for charging the battery 150. Thus, according to the state of the battery 150, the charging electric power upper limit value |Win| is set. Qualitatively, when the temperature of the battery 150 is high or low, the charging electric power upper limit value |Win| is set to be lower than that when the temperature of the battery 150 is room temperature. In addition, according to an increase in SOC, the charging electric power upper limit value |Win| is set to be low in order to avert overcharging.

Alternatively, in a case where the battery 150 is a lithium secondary battery, Win and Wout may be restricted in order to prevent deposition of lithium by continuation of charging and discharging. For example, with regard to the restriction on the charge, the charging electric power upper limit value |Win| is preferably lowered gradually according to an increase in the total value of a charging current (in a specific time period). Alternatively, the charging electric power upper limit value |Win| may also be gradually lowered according to an increase in the total value of the square of the charging current (in a predetermined time period) so that the thermal load of the component such as the battery 150 or the converter 200 is reflected.

In Step S30, the ECU 170 calculates total power Pt1 in the entire vehicle based on the state of the hybrid car. The total power Pt1 is the sum of running request power Pr that is the power requested to be output for running and charging request power Pchg that is the power requested to be output for charging.

The running request power Pr is determined based on the vehicle speed of the hybrid car and the amount of operation of an accelerator pedal by a driver. That is, the running request power Pr is set such that an acceleration of the hybrid car corresponding to the operation of the accelerator pedal occurs. Consequently, during stop of the vehicle, Pr=0 is satisfied.

The charging request power Pchg is determined such that the SOC of the battery 150 is maintained within a specific range. Thus, when the SOC is higher than a certain level, the charging request power Pchg is set to satisfy Pchg=0. On the other hand, when the SOC is lower than the certain level, the charging request power Pchg is set to satisfy Pchg>0 in order to request charging of the battery 150. The charging request power Pchg is also set to satisfy Pchg>0 during forced charge described later. Note that, when the SOC is high, the charging request power Pchg may also be set to satisfy Pchg<0 in order to accelerate discharging of the battery 150.

In Step S40, the ECU 170 controls power distribution among the engine 100, the first MG 110, and the second MG 120. Specifically, the power distribution is controlled such that the battery electric power Pb represented by Pb=-(Pm1+Pm2) wherein Pm1 is input/output electric power of the first MG 110 and Pm2 is input/output electric power of the second MG 120 falls within a range from Win to Wout. In accordance with the result of the power distribution, the torque command value of each of the first MG 110 and the second MG 120 and operation points (RPM and load) of the engine 100 are determined.

When the charging of the battery 150 is requested during running of the vehicle and during stop of the vehicle, the power distribution is determined such that the battery 150 is charged within a range where Pb>Win is satisfied. During stop of the vehicle, Pr=0 is satisfied. When the SOC is lowered, Pchg is set to satisfy Pchg>0, the engine 100 is started correspondingly, and the battery 150 is charged with the generated electric power from the first MG 110. Also in this case, the output of each of the engine 100 and the first MG 110 is controlled within the range where Pb>Win is satisfied.

Figure 5:
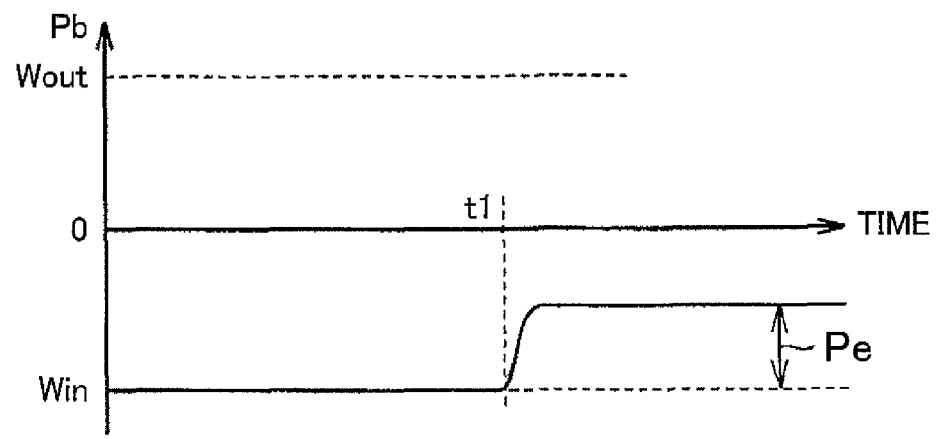
FIG. 5 shows a first example of an operation waveform diagram during charging of a battery.
Figure 6:
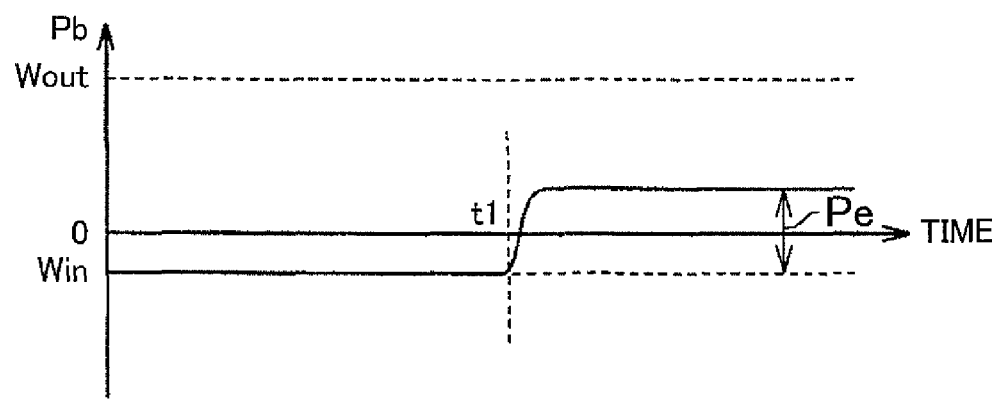
FIG. 6 shows a second example of the operation waveform diagram during charging of the battery.

Each of FIGS. 5 and 6 shows an example of an operation waveform during charging of the battery. FIG. 5 shows an example when the charging electric power upper limit value |Win| is sufficiently large.

Referring to FIG. 5, the battery 150 is charged with Pb substantially in the vicinity of Win in response to the charging request of the battery 150. Although not shown, the SOC of the battery 150 is gradually increased by the charging with Pb.

From time t1, electric power is consumed by the electric equipment connected to the receptacle 310. That is, electric power supply to the "external equipment" that is not the component of the vehicle is started. Note that electric power consumption Pe from the outlet 310 is not reflected in the power distribution control described with reference to FIG. 4. As a result, although the charging electric power (|Pb|) is reduced by the portion corresponding to the electric power consumption Pe of the external equipment, the charging electric power upper limit value |Win| is large and therefore, Pb<0 still holds. Thus, even when the electric power consumption from the receptacle 310 occurs, the SOC continues to increase when the charging of the battery 150 is requested. That is, it is unlikely that the forced charging involving the operation of the engine 100 for averting the low SOC state continues for a long period of time.

On the other hand, FIG. 6 shows an example when the charging electric power upper limit value |Win| is small. Referring to FIG. 6, until time t1, the battery 150 is charged with Pb in the vicinity of Win. With this, although the SOC of the battery 150 is gradually increased, the increase rate of the SOC is smaller than that during the charging shown in FIG. 5.

As in the case of FIG. 5, from the time t1, the electric power consumption Pe from the receptacle 310 occurs. With this, the electric power for charging the battery 150 is further reduced. As a result, when the charging electric power upper limit value |Win| is small, once the SOC is lowered and the forced charging is started, there is a fear that it takes a long time before the low SOC state that requires the forced charging is ended.

As shown in FIG. 6, particularly in a case where the charging electric power upper limit value |Win| is smaller than Pe, there is a fear that Pb becomes positive (Pb>0) and it becomes impossible to charge the battery 150. In such a case, there is a fear that the low SOC state continues for a longer time period.

Thus, in the case where the electric power is supplied to the external equipment when the charging electric power upper limit value |Win| is small, there is a fear that the low SOC state that requires the forced charge continues for a long time period. As a result, there is a fear that the duration of operation of the engine 100 because of the forced charging increases and fuel efficiency thereby deteriorates.

Consequently, in the hybrid car according to the embodiment of the invention, the following control is executed for the electric power supply to the external equipment.

Figure 7:
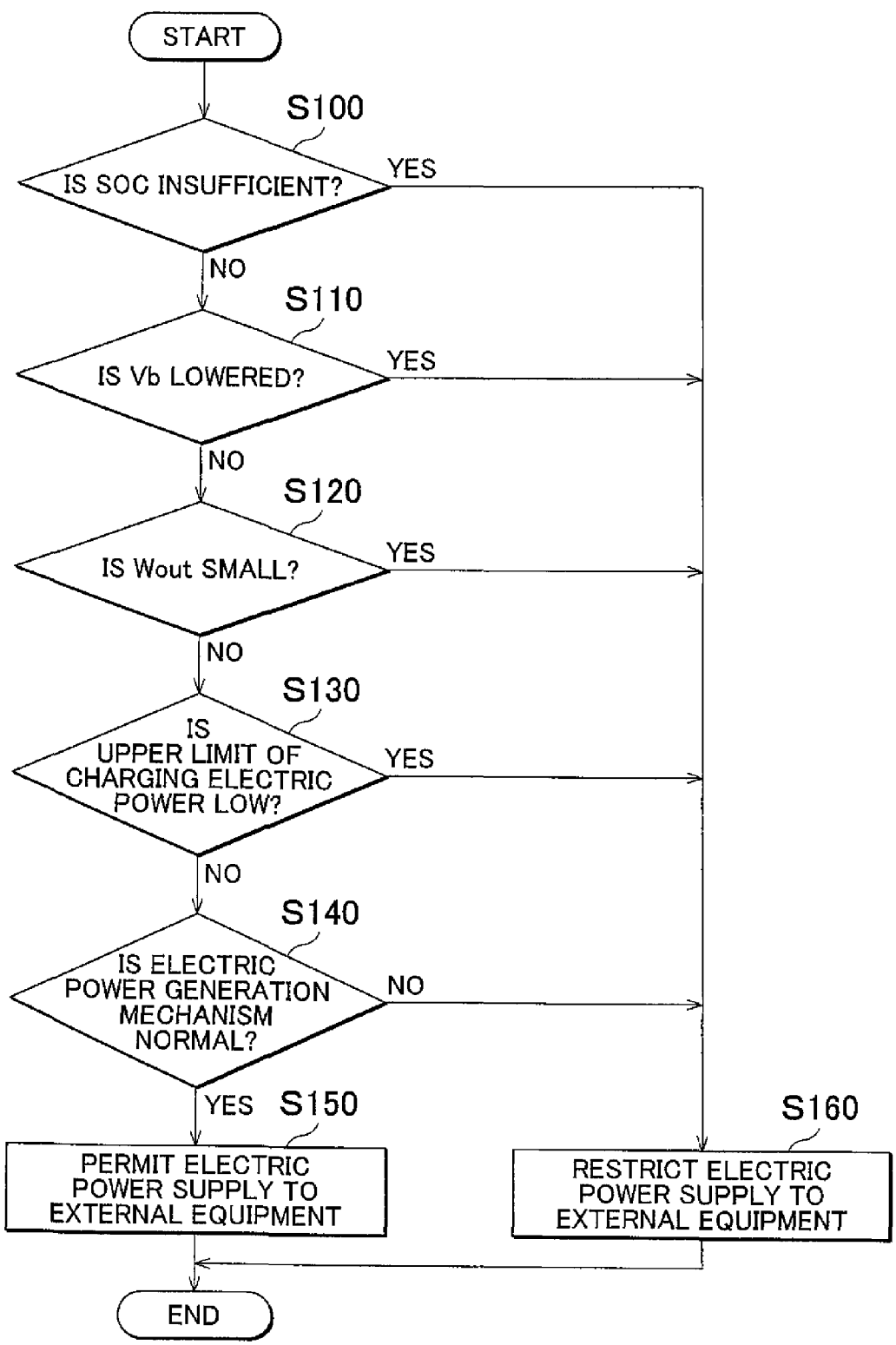
FIG. 7 is a flowchart for explaining a process procedure of an electric power supply control according to the embodiment of the invention.

FIG. 7 shows a flowchart for explaining a process procedure of an electric power supply control according to the embodiment of the invention. A control process by the flowchart shown in FIG. 7 is executed in a predetermined cycle by the ECU 170 when the electric power supply mode is selected.

Referring to FIG. 7, when the electric power supply mode is selected, the ECU 170 executes a determination of a discharge capability of the battery 150 in Steps S100 to S120. Specifically, in Step S100, the ECU 170 determines whether or not the SOC is insufficient. When the SOC is lower than a predetermined determination value, it is determined that the output of the battery 150 cannot afford to supply electric power to the external equipment, and a positive determination (YES) is made in Step S100.

In Step S110, the ECU 170 determines whether or not a battery voltage Vb is lowered. When the battery voltage is lower than a predetermined determination value, it is determined that the output of the battery 150 cannot afford to supply the electric power to the external equipment, and a positive determination (YES) is made in Step S110.

In addition, in Step S120, the ECU 170 determines whether or not the output electric power upper limit value Wout is small. When Wout is smaller than a predetermined determination value, it is determined that the output of the battery 150 cannot afford to supply the electric power to the external equipment, and a positive determination (YES) is made in Step S120.

When it is determined that the output of the battery 150 cannot afford to supply the electric power to the external equipment in Steps S100 to S120 (YES in any one of S100 to S120), the ECU 170 advances the process to Step S160, and restricts the electric power supply to the external equipment. Typically, the electric power supply is restricted by halting the electric power converter 300 to thereby suspend the electric power supply. Alternatively, the electric power supply may be restricted by reducing the output electric power of the electric power converter 300 to below the electric power to be supplied in Step S150 described later in order to suppress a reduction amount of the charging electric power. Thus, the "restriction on the electric power supply" in the embodiment is a concept that includes both of the suspension of the electric power supply and the reduction of the electric power to be supplied.

On the other hand, when it is determined that the output of the battery 150 can afford to supply the electric power to the external equipment in Steps S100 to S120 (NO in each of S100 to S120), the ECU 170 advances the process to Step S130, and determines whether or not the upper limit of the electric power for charging the battery 150 is lower than a predetermined amount. Typically, it is determined whether or not the charging electric power upper limit value |Win| is lower than a predetermined determination value.

Note that, as described above, since the charging electric power is limited according to the SOC, the battery temperature, or the total value of the charging current (or the square of the charging current), it is also possible to execute the determination in Step S130 by using another parameter than |Win|.

When the upper limit of the electric power for charging the battery 150 is lower than the predetermined amount (YES in S130), the ECU 170 advances the process to Step S160, and restricts the electric power supply to the external equipment.

When the upper limit of the electric power for charging the battery 150 is not lower than the predetermined amount (NO in S130), the ECU 170 advances the process to Step S140, and determines whether or not the electric power generation mechanism for forcibly charging the battery 150 can operate normally. Subsequently, when the electric power generation mechanism is normal (YES in S140), the ECU 170 advances the process to Step S150, and permits the electric power supply to the external equipment. In this case, the output electric power from the electric power converter 300 is set to a normal level. That is, the electric power to be supplied in the electric power supply in Step S150 is larger than the electric power to be supplied in the electric power supply in Step S160. Note that Step S160 includes a case where the electric power to be supplied is zero (i.e., the electric power supply is prohibited).

On the other hand, when the electric power generation mechanism has an abnormality (NO in S140), the ECU 170 advances the process to Step S160. The content of the restriction on the electric power supply in Step S160 may be changed according to which one of the determinations in the preceding steps the restriction is based on. For example, the electric power supply may be prohibited (the electric power to be supplied=0) in the restriction on the electric power supply based on one of the determinations in Steps S100 to S120 and S140, while in the restriction on the electric power supply based on the determination in Step S130, the electric power to be supplied may be reduced. Alternatively, it is also possible to prohibit the electric power supply in Step S160 regardless of the determination.

Thus, in the electric power supply control of the electric vehicle according to the embodiment of the invention, the condition, based on which it is determined whether or not the restriction on the electric power supply to the external equipment is necessary, includes not only the condition related to the discharge capability of the battery 150 but also the condition related to the upper limit of the electric power for charging the battery 150. Thus, it is determined whether or not the restriction on the electric power supply is necessary so that the electric power to be supplied is controlled also according to the upper limit of the charging electric power.

With this, it is possible to prevent the continuation of the low SOC state for a long time period that is caused by a charging state in which the charging electric power cannot be secured due to the electric power supply to the external equipment, as shown in FIG. 6. As a result, it is possible to prevent the deterioration of fuel efficiency that is caused by the operation of the engine 100 for a long time period resulting from the forced charge of the battery 150.

Figure 8:
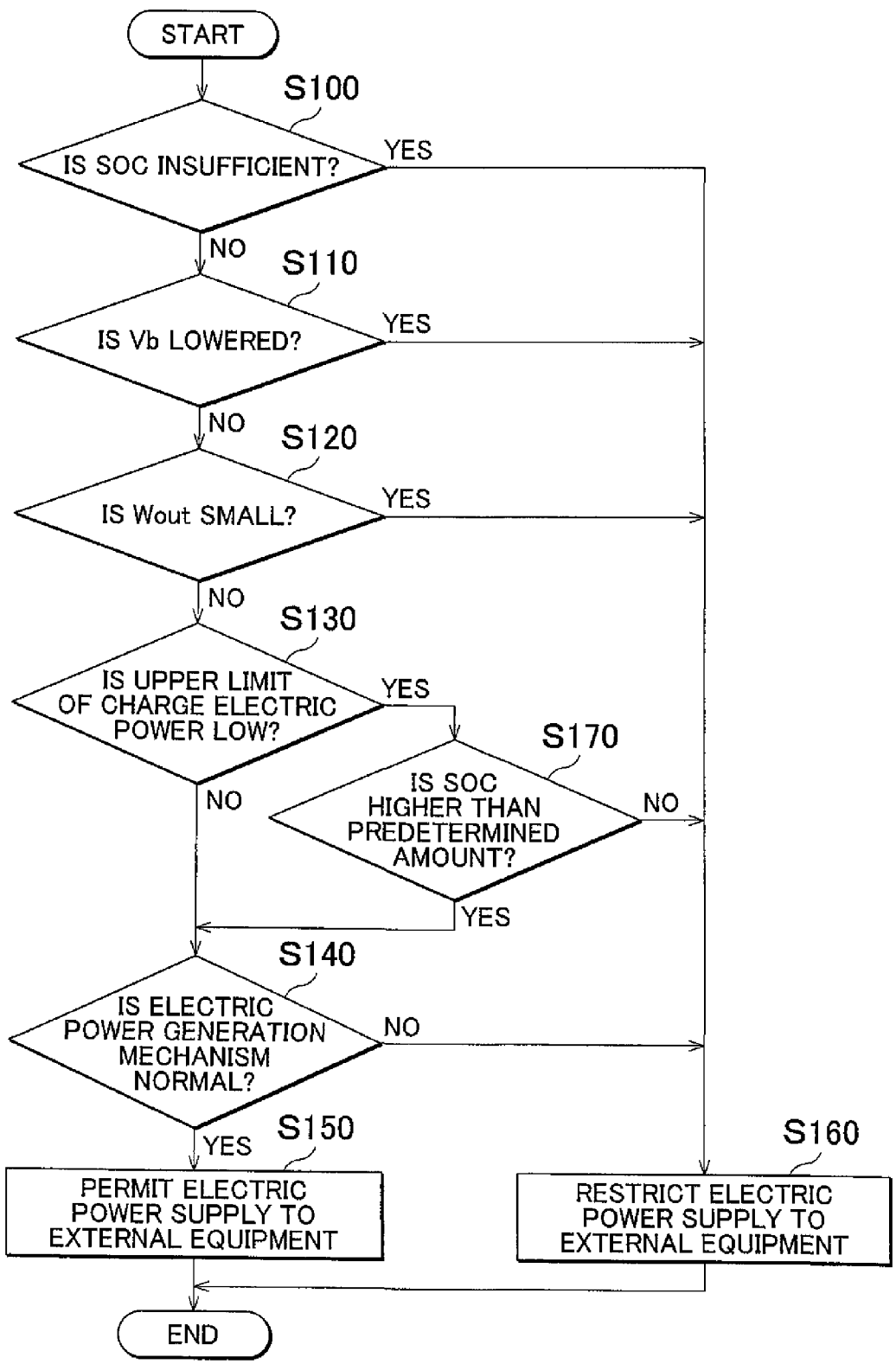
FIG. 8 is a flowchart for explaining a process procedure of an electric power supply control according to a modification of the embodiment of the invention.

FIG. 8 shows a flowchart for explaining a process procedure of an electric power supply control according to a modification of the embodiment of the invention. A control process according to the flowchart shown in FIG. 8 is executed in a predetermined cycle by the ECU 170 when the electric power supply mode is selected.

As can be seen from a comparison between FIGS. 8 and 7, in the electric power supply control according to the modification of the embodiment, the ECU 170 further executes a process in Step S170 in addition to the processes in Steps S100 to S160 shown in FIG. 7.

When the upper limit of the electric power for charging the battery 150 is lower than the predetermined amount (YES in S130), the ECU 170 determines whether or not the predetermined amount of the SOC is secured in Step S170. For example, by comparing the SOC with a predetermined determination value, the determination in Step S170 can be executed. The determination value (SOC) in Step S170 is higher than the SOC serving as a threshold value at which the forced charge is started, and is preferably set so as to have a sufficient margin with respect to the threshold value.

As described above, a purpose for involving the upper limit of the charging electric power in the determination of the need for the electric power supply in Step S130 is to prevent the operation of the engine 100 for a long time period resulting from the forced charge. In the high SOC region, even when electric power is supplied to the external equipment, the forced charge is not started. Consequently, in light of the above purpose, even when it is, difficult to secure the charging electric power, it is preferable to prioritize the electric power supply to the external equipment.

Accordingly, even when the upper limit of the electric power for charging the battery 150 is lower than the predetermined amount, in a case where the predetermined amount of the SOC is secured (YES in S170), the ECU 170 advances the process to Steps S140 to S150, and can permit the electric power supply to the external equipment.

On the other hand, when the predetermined amount of the SOC is not secured (NO in S170), the ECU 170 advances the process to Step S160, and restricts the electric power supply to the external equipment.

As a result, according to the electric power supply control shown in FIG. 8, it becomes possible to prevent the occurrence of the situation where the low SOC state where the battery 150 is forcibly charged continues for a long time period, and secure the opportunity for the electric power supply to the external equipment.

Figure 9:
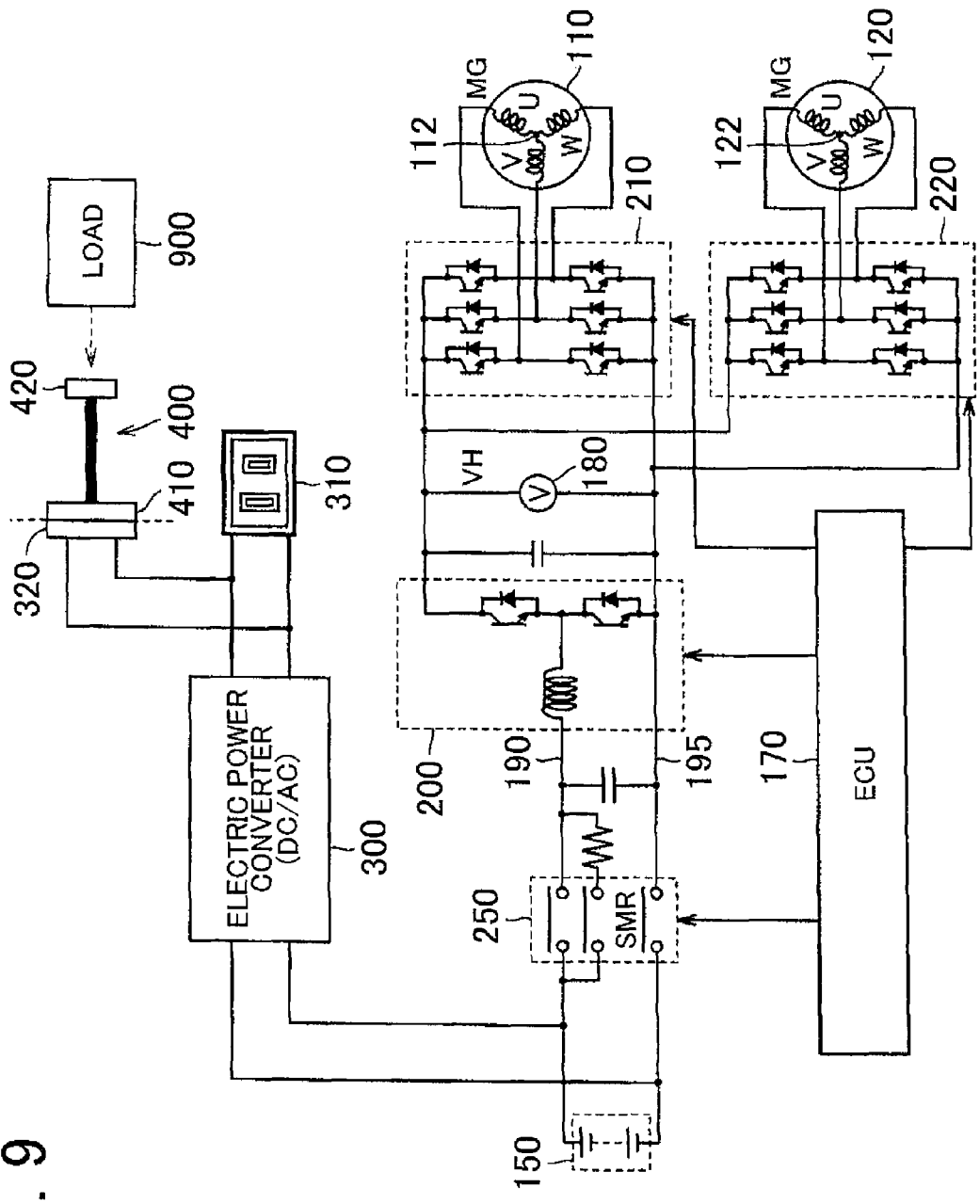
FIG. 9 is a schematic diagram showing another example of a configuration of equipment to which electric power is supplied in an electric power supply mode in an electric vehicle according to an embodiment of the invention.

FIG. 9 shows another example of a configuration of equipment to which electric power is supplied in an electric power supply mode in an electric vehicle according to an embodiment of the invention.

In a modification shown in FIG. 9, the electric vehicle further includes an inlet 320 for exchanging electric power between the vehicle and the outside of the vehicle. The inlet 320 corresponds to an "electric power node" of the invention. The electric power to be supplied that is outputted from the electric power converter 300 is outputted from the inlet 320. That is, in the example of the configuration in FIG. 9, the electric power to be supplied from the electric power converter 300 can be supplied to a load 900 outside the vehicle via the inlet 320.

For example, when a connector 410 of a cable 400 is connected to the inlet 320 of the vehicle and a plug 420 of the cable 400 is connected to the load 900, electric power can be supplied from the electric vehicle to the load 900.

That is, the electric power supply to the external equipment according to the invention is a concept that includes not only the electric power supply to the electric equipment connected to the receptacle 310 in the vehicle cabin but also the electric power supply to the load (the electric equipment) outside the vehicle. In the example of the configuration in FIG. 9, when the cable 400 is attached and the electric power supply to the external equipment from the electric vehicle is requested by a user, the electric power supply mode is applied. Note that, in the example of the configuration in FIG. 9, the receptacle 310 may be omitted.

In addition, although FIG. 9 shows, as an example, the configuration in which the electric vehicle and the load 900 are electrically connected to each other using the cable 400, it is also possible to adopt a configuration in which the vehicle and the load are electromagnetically coupled to each other without being in contact with each other and electric power is exchanged therebetween. For example, instead of using the cable, it is also possible to employ a configuration in which coils are provided on the load side and the vehicle side and electric power is inputted and outputted by magnetic coupling or resonance phenomenon between the coils. In such a configuration, the coil mounted on the vehicle corresponds to the "electric power node".

In addition, the electric vehicle to which the electric power supply controls according to the embodiment and its modification of the invention are applied is not limited to the hybrid car shown as an example in FIG. 1. In FIG. 1, the example in which the engine 100 and the first MG 110 constitute the "electric power generation mechanism" that generates the electric power for charging the battery 150 has been described. However, the electric vehicle to which the invention is applied may have any configuration as long as the configuration includes the "electric power generation mechanism" capable of actively generating the electric power for charging the vehicle-mounted electric power storage device (the battery 150 of FIG. 1). That is, the invention can be applied to the electric vehicle without limiting the number of motor generators or the coupling between the motor generators and the engine to the example of the configuration in FIG. 1. Alternatively, it is also possible to constitute the "electric power generation mechanism" by using another power source than the engine, e.g., a fuel cell. That is, the electric vehicle includes a fuel cell car.

The embodiment and its modification disclosed herein are to be considered in all aspects as illustrative and not restrictive. It is intended that the scope of the invention is indicated by the appended claims, not by the foregoing description, and covers all the modifications that are within the scope of the claims and the meaning and scope of equivalents.

The invention can be applied to an electric vehicle having an operation mode in which electric power is supplied to external equipment that is not the component of the vehicle, by using electric power of a vehicle-mounted electric power storage device.

The controller may be configured to restrict electric power supply by the electric power supply device when the upper limit of the charging electric power is lower than the predetermined amount.

The controller may be configured not to restrict the electric power supply when a state of charge (SOC) of the electric power storage device is higher than a predetermined value even when the upper limit of the charging electric power is lower than the predetermined amount.

The electric power supply device may include a receptacle that outputs the electric power to be supplied to the external equipment and is provided in a vehicle cabin, and an electric power converter that is configured to convert the output electric power from the electric power storage device to the electric power to be supplied and output to the receptacle the electric power to be supplied.

The electric power supply device may include an electric power node that exchanges electric power between the electric vehicle and an outside of the electric vehicle, and an electric power converter that is configured to convert the output electric power from the electric power storage device to the electric power to be supplied to the external equipment and output to the electric power node the electric power to be supplied.

The controller may be configured to lower the upper limit of the charging electric power according to a reduction in a temperature of the electric power storage device. The controller may be configured to lower the upper limit of the charging electric power according to an increase in a total value of charging current and discharging current of the electric power storage device The controller may be configured to lower the upper limit of the charging electric power according to an increase in a state of charge (SOC) of the electric power storage device.

What is claimed is:

1. An electric vehicle comprising:
a vehicle-mounted electric power storage device;
an electric power generation mechanism that is configured to generate charging electric power for charging the electric power storage device;
an electric power supply device that is configured to supply electric power to external equipment that is not a component of the electric vehicle, by using output electric power from the electric power storage device; and
a controller that is configured to control electric power to be supplied by the electric power supply device, according to information indicative of an upper limit of the electric power for charging the electric power storage device wherein the information indicates if the upper limit of the electric power is lower than a predetermined amount, wherein the controller is configured to restrict electric power supply by the electric power supply device when the upper limit of the charging electric power is lower than the predetermined amount.

2. The electric vehicle according to claim 1, wherein the controller is configured to restrict the electric power supply by the electric power supply device when the information indicative of the upper limit of the charging electric power indicates that the upper limit of the charging electric power is lower than the predetermined amount.

3. The electric vehicle according to claim 2, wherein the controller is configured to suspend the electric power supply by the electric power supply device when the information indicative of the upper limit of the charging electric power indicates that the upper limit of the charging electric power is lower than the predetermined amount.

4. The electric vehicle according to claim 1, wherein the controller is configured not to restrict the electric power supply when a state of charge (SOC) of the electric power storage device is higher than a predetermined value even when the upper limit of the charging electric power is lower than the predetermined amount.

5. The electric vehicle according to claim 1, wherein the electric power supply device includes a receptacle that outputs the electric power to be supplied to the external equipment and is provided in a vehicle cabin, and an electric power converter that is configured to convert the output electric power from the electric power storage device to the electric power to be supplied and output to the receptacle the electric power to be supplied.

6. The electric vehicle according to claim 1, wherein the electric power supply device includes an electric power node that exchanges electric power between the electric vehicle and an outside of the electric vehicle, and an electric power converter that is configured to convert the output electric power from the electric power storage device to the electric power to be supplied to the external equipment and output to the electric power node this electric power.

7. The electric vehicle according to claim 1, wherein the controller is configured to lower the upper limit of the charging electric power according to a reduction in a temperature of the electric power storage device.

8. The electric vehicle according to claim 1, wherein the controller is configured to lower the upper limit of the charging electric power according to an increase in a total value of charging current and discharging current of the electric power storage device.

9. The electric vehicle according to claim 1, wherein the controller is configured to lower the upper limit of the charging electric power according to an increase in a state of charge (SOC) of the electric power storage device.

* * * * *